US010940939B2

United States Patent
Eddy et al.

(10) Patent No.: US 10,940,939 B2
(45) Date of Patent: Mar. 9, 2021

(54) GROUND SPOILER CONTROL ARCHITECTURE FOR AIRCRAFT

(71) Applicant: Textron Aviation Inc., Wichita, KS (US)

(72) Inventors: Stephen M. Eddy, Derby, KS (US); Scott Stallard, Valley Center, KS (US); Richard John Scillia, Wichita, KS (US)

(73) Assignee: Textron Innovations, Inc., Providence, RI (US)

( * ) Notice: Subject to any disclaimer, the term of this patent is extended or adjusted under 35 U.S.C. 154(b) by 196 days.

(21) Appl. No.: 16/213,305

(22) Filed: Dec. 7, 2018

(65) Prior Publication Data

US 2019/0176966 A1 Jun. 13, 2019

Related U.S. Application Data

(60) Provisional application No. 62/597,068, filed on Dec. 11, 2017.

(51) Int. Cl.
*B64C 13/16* (2006.01)
*B64C 9/32* (2006.01)
*B64C 13/50* (2006.01)

(52) U.S. Cl.
CPC .............. *B64C 13/16* (2013.01); *B64C 9/32* (2013.01); *B64C 13/504* (2018.01)

(58) Field of Classification Search
CPC ......... B64C 13/16; B64C 13/504; B64C 9/32; B64C 13/00; G05B 9/03; G05D 1/0077; B64D 45/0005; B64D 2045/001
See application file for complete search history.

(56) References Cited

U.S. PATENT DOCUMENTS

| | | | |
|---|---|---|---|
| 5,493,497 A | 2/1996 | Buus | |
| 6,561,463 B1 | 5/2003 | Yount et al. | |
| 6,860,452 B2 | 3/2005 | Bacon et al. | |
| 2003/0127569 A1* | 7/2003 | Bacon | B64C 13/505 244/195 |
| 2004/0245386 A1* | 12/2004 | Huynh | B64C 9/16 244/99.5 |
| 2011/0251739 A1 | 10/2011 | Tomas et al. | |

(Continued)

*Primary Examiner* — Anne Marie Antonucci
*Assistant Examiner* — Andrew J Cromer
(74) *Attorney, Agent, or Firm* — Erise IP, P.A.

(57) ABSTRACT

A ground spoiler control architecture for aircraft includes a primary control architecture for providing a roll function, a speed-brake function and a ground spoiler function, and a secondary control architecture for providing the ground spoiler function in the event of a failure of the primary control architecture. The primary and secondary control architectures each include multiple actuators for actuating ground spoilers via independent and redundant signaling paths. Redundant hydraulic accumulators provide pressurized hydraulic fluid to the actuators. A ground spoiler control method includes determining whether the aircraft is on the ground based on the throttle-level-angle and whether any two wheels speeds are active or whether the main landing gear is weighted. Deployment of at least a portion of the ground spoiler panels occurs when and when the main landing gear is on the ground and the aircraft is in a landing configuration based on the throttle-level-angle.

16 Claims, 5 Drawing Sheets

(56) References Cited

U.S. PATENT DOCUMENTS

| | | |
|---|---|---|
| 2014/0239126 A1 | 8/2014 | Hara |
| 2014/0324254 A1* | 10/2014 | Lin .................. B64C 19/00 701/4 |
| 2015/0321748 A1 | 11/2015 | Johnson et al. |
| 2016/0139597 A1 | 5/2016 | Letang et al. |

* cited by examiner

GROUND SPOILER CONTROL ARCHITECTURE FOR AIRCRAFT

CROSS-REFERENCE TO RELATED APPLICATIONS

This application claims the benefit of U.S. Provisional Patent Application Ser. No. 62/597,068 entitled Ground Spoiler Control Architecture For Aircraft and filed Dec. 11, 2017, the disclosure of which is herein incorporated by reference in its entirety.

BACKGROUND

1. Field of the Disclosure

Embodiments of this disclosure relate generally to the field of fly-by-wire control systems for aircraft, and more specifically to providing a control architecture for reliable ground spoiler deployment.

2. Description of the Related Art

Control of ground spoilers (also known as speed brakes) have been provided in a variety of ways in prior art aircraft. For example, U.S. Patent Publication 2016/0139597 to Letang et al. discloses an aircraft ground lift-dump flight control function. U.S. Pat. No. 6,561,463 to Yount et al. discloses a flight control module with integrated spoiler actuator control electronics. U.S. Patent Publication 2014/0239126 to Hara discloses an aircraft drive system that automatically deploys a ground spoiler based on wheel speed, airspeed, and landing gear touchdown even if a wheel becomes locked. U.S. Patent Publication 2015/0321748 to Johnson et al. discloses a speed brake alerting system and method. U.S. Pat. No. 6,860,452 to Bacon et al. discloses a distributed control system for aircraft having a first group of digital controllers and a second group of analog controllers, with different spoiler pairs being controlled by the different groups of controllers.

SUMMARY

In an embodiment, a ground spoiler control architecture for aircraft is provided. The ground spoiler control architecture includes a plurality of actuators each adapted for actuating a respective one of a plurality of ground spoilers. A primary controller is communicatively coupled to the plurality of actuators for controlling the actuators based on a first set of input signals in a first mode. A secondary controller is communicatively coupled to the plurality of actuators for controlling the actuators based on a second set of input signals in a second mode. A first hydraulic subsystem provides pressurized hydraulic fluid to a portion of the plurality of actuators, and a second hydraulic subsystem provides pressurized hydraulic fluid to a remaining portion of the plurality of actuators.

In another embodiment, a ground spoiler control architecture for aircraft includes a primary control architecture for providing a roll function, a speed-brake function, and a ground spoiler function in a first mode. The primary control architecture includes a plurality of actuators for actuating a plurality of ground spoilers, respectively. A primary controller is communicatively coupled to the plurality of actuators via a primary set of signaling paths. The primary controller is adapted to transmit and receive a primary signal set via the primary set of signaling paths. The ground spoiler control architecture further includes a secondary control architecture for providing the ground spoiler function in a second mode in the event of a failure of the primary control architecture. The secondary control architecture includes a plurality of actuators for actuating the plurality of ground spoilers, respectively. A secondary controller is communicatively coupled to the plurality of actuators via a secondary set of signaling paths. The secondary controller is adapted to transmit and receive a secondary signal set via the secondary set of signaling paths.

In yet another embodiment, a ground spoiler control method for an aircraft includes determining whether the aircraft is on the ground based on whether any two wheels speeds are active or whether the main landing gear is weighted. The method further includes deploying a plurality of ground spoiler panels when the aircraft is in a landing configuration based on the throttle-level-angle and when the main landing gear is on the ground.

BRIEF DESCRIPTION OF THE SEVERAL VIEWS OF THE DRAWINGS

Illustrative embodiments of the present disclosure are described in detail below with reference to the attached drawing figures, which are incorporated by reference herein and wherein.

DETAILED DESCRIPTION

Redundant flight control systems provide increased safety at a cost of increased complexity and weight. For providing highly reliable control of a hydraulically actuated flight control surface that has critical function, failure of any single component to function when expected should be considered. In addition, failure of any single component that causes an actuator to inadvertently function should also be considered. However, requirements that each component functions when expected (e.g., is highly available) and does not function unexpectedly (e.g., has high integrity) often conflict with one another.

Embodiments of the present disclosure provide an electronically commanded (fly-by-wire) ground-spoiler architecture having a dual-parallel and dual-series arrangement of control components. Redundant sources of hydraulic-pressure for powering hydraulic-pressure actuators are also provided to ensure that no single failure will cause the loss of ground spoiler function. For the spoiler system, the ground-spoiler architecture provides a high availability for deployment (e.g., a per flight-hour probability $>10^9$) and a low probability of inadvertent actuation (e.g., a per flight-hour probability $<10^{-9}$), while allowing runway distances for landing and rejected takeoff to remain unchanged. A single spoiler failure within acceptable criteria may be permitted while maintaining high availability for deployment and low probability of inadvertent actuation for the remaining spoiler surfaces.

Advantages of the disclosed embodiments include improved availability of ground stopping systems, of which ground spoilers are a significant contributor. Additionally, increased criticality requirements for runway excursions may be met without an increased aircraft-balanced field length.

Figure 1:
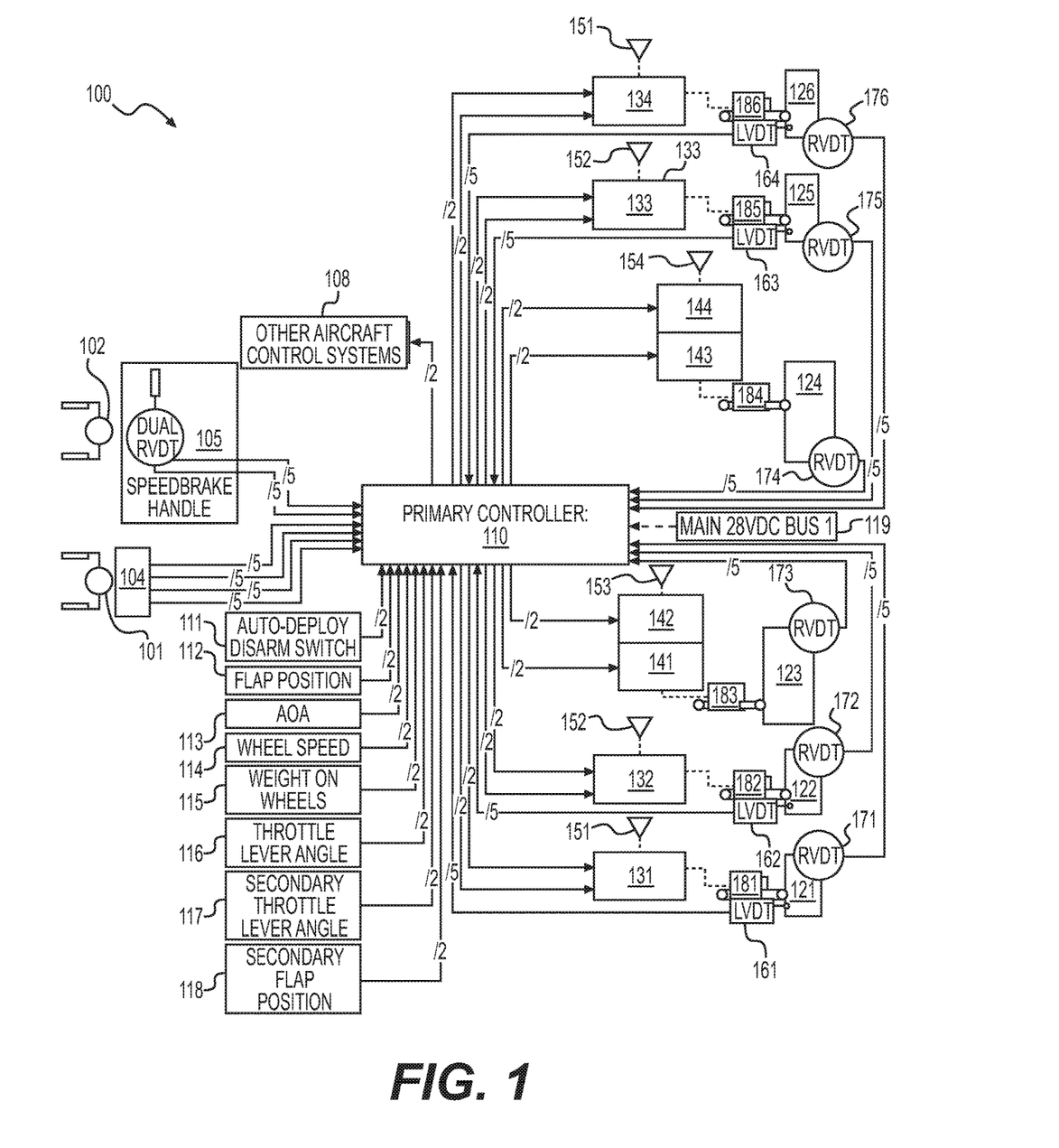
FIG. 1 is a schematic diagram showing a primary ground spoiler control architecture, in an embodiment.

FIG. 1 is a schematic diagram showing a primary ground spoiler control architecture 100. Primary architecture 100 includes a primary controller 110 configured to transmit and receive control signals for controlling control surfaces in a first mode of operation (e.g., a normal mode of operation). Primary controller 110 has a memory, including a non-transitory medium for storing software/firmware, and a processor for executing instructions of the software/firmware. A main 28-volt direct current (DC) bus 119 provides electrical power to primary controller 110.

Figure 2:
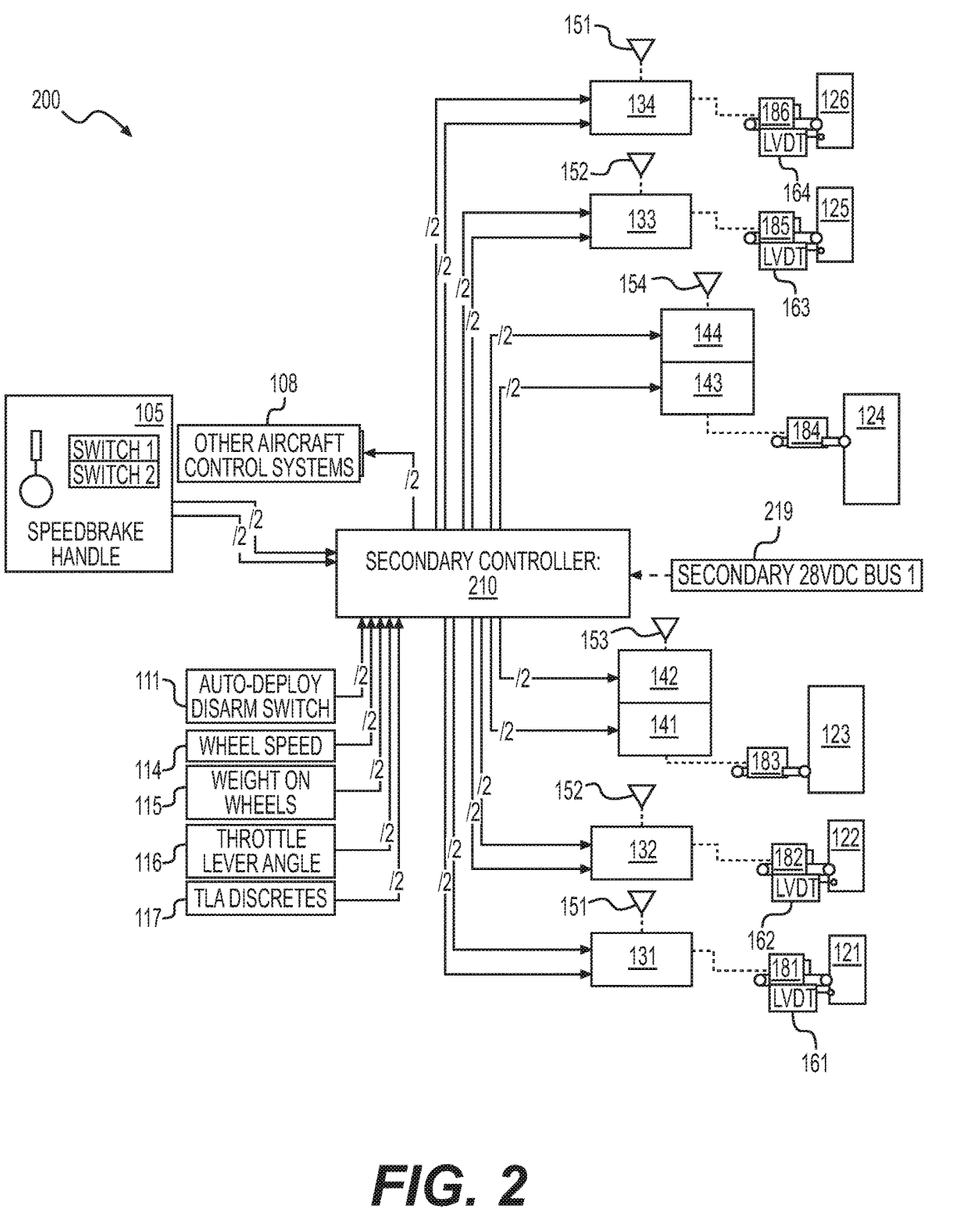
FIG. 2 is a schematic diagram showing a secondary ground spoiler control architecture, in an embodiment.

Control signals are transmitted from primary controller 110 using dedicated communication signal paths, and control signals are received using dedicated monitoring signal paths. Redundant signaling paths are used to ensure that a failure of any signal path does not lead to loss of control of a ground spoiler. As indicated in FIGS. 1 and 2, signal paths are duplicated (e.g., for paths labeled "/2"). In some embodiments, a higher number of redundant signal paths are provided (e.g., paths labeled "/5" have five redundant signal paths). In addition to redundant paths, command signals are also sent redundantly. For example, separate signal sets are sent for each command such that despite a loss of any signal set, full normal deployment of the ground spoilers is maintained. Communication and monitoring signal paths are fully testable during automated preflight tests, which is important for discovering latent failures or failures that are not readily apparent in order to meet the high availability targets.

As depicted in FIG. 1, primary architecture 100 provides control of six spoilers, 121, 122, 123, 124, 125, and 126, (e.g., three on each wing), but primary architecture 100 may be configured to control more or fewer spoilers without departing from the scope hereof. Spoilers 121-126 are moveable panels that serve as control surfaces along the trailing edge of an aircraft wing. As depicted in FIGS. 1 and 2, spoilers 121 and 126 form a pair of outboard spoilers for roll function; spoilers 122 and 125 form a middle pair of spoilers (e.g., for roll function); and, spoilers 123 and 124 include large inboard panels (e.g., ground spoilers). By providing coordinated control of spoilers 121-126, primary controller 110 provides a plurality of functions including a roll function, a speed-brake function, and a primary ground-spoiler function for aircraft. Movement of each spoiler is actuated via at least one actuator (e.g., a hydraulic, pneumatic, electric, or mechanical actuator).

As depicted in FIG. 1, six hydraulic actuators 181, 182, 183, 184, 185, and 186 are mechanically coupled to a respective one of the six spoilers 121-126. Extension of each hydraulic actuator (e.g., by porting hydraulic fluid into a cylinder to drive a piston) provides displacement of the respective spoiler. Hydraulic fluid is ported to the hydraulic cylinder via a valve, such an electro-hydraulic servo valve (EHSV) or a solenoid valve. As depicted in FIG. 1, primary architecture 100 includes four EHSVs 131, 132, 133, and 134 fluidly coupled with hydraulic actuators 181, 182, 185, and 186 for actuating spoilers 121, 122, 125, and 126, respectively. A first pair of solenoid valves 141, 142 are arranged in series and fluidly coupled with hydraulic actuator 183 to actuate spoiler 123, and a second pair of solenoid valves 143, 144 are arranged in series and fluidly coupled with hydraulic actuator 184 to actuate spoiler 124.

As depicted in FIG. 1, two separate communication signal paths provide command signals from primary controller 110 to each of the EHSVs 131-134, and each of these communication signal paths is provided in duplicate for redundancy. One of the two communication signal paths is used to control a primary torque motor of the EHSV and the other is used to control an enable valve, as described below in connection with FIG. 3. A communication signal path is also provided in duplicate to each of the solenoid valves 141-144.

Hydraulic fluid pressure may be provided by one or more main hydraulic subsystems (see e.g., FIG. 3, described below). Each hydraulic subsystem is augmented by hydraulic accumulators, which maintain a reservoir of pressurized hydraulic fluid for dispensing to one or more actuators and provide hydraulic pressure to the spoiler actuators after any failure of the main hydraulic subsystem. For the embodiment depicted in FIG. 1, primary architecture 100 includes four hydraulic fluid pressure accumulators 151, 152, 153, and 154 to provide redundancy in case of an accumulator failure. Accumulator 151 provides pressurized hydraulic fluid to EHSVs 131 and 134 (e.g., for the outboard pair of roll spoilers 121 and 126); accumulator 152 provides pressurized hydraulic fluid to EHSVs 132 and 133 (e.g., for the middle pair of spoilers 122 and 125); accumulator 153 provides pressurized hydraulic fluid to solenoid valves 141 and 142 (e.g., for large inboard spoiler 123); and, accumulator 154 provides pressurized hydraulic fluid to solenoid valves 143 and 144 (e.g., for large inboard spoiler 124). In certain embodiments, accumulators 151 and 152 are supplied by a first hydraulic fluid subsystem, whereas accumulators 153 and 154 are supplied by a second hydraulic fluid subsystem. However, arrangement of the accumulators for supplying hydraulic fluid pressure may be varied without departing from the scope hereof.

Accumulators 151-154 are enabled by the same logic that deploys the ground spoilers (see FIGS. 4 and 5), which prevents unintended discharge that might drain the back-up accumulators. Shutoff valves coupled to the output of each accumulator are used to prevent unintended discharge (e.g., see enable valves 393, 394 of FIG. 3). As depicted in FIGS. 1 and 2, each large inboard panel has a back-up hydraulic accumulator and each pair of smaller roll spoiler panels share a back-up hydraulic accumulator.

A position displacement measuring device, such as a linear variable differential transformer (LVDT), may be coupled with each actuator to provide position information of the actuator back to primary controller 110 for comparing with the command signal for providing closed-loop control. As depicted in FIG. 1, LVDTs 161, 162, 163, and 164 are coupled to actuators 181, 182, 185, and 186, respectively. Differences between the commanded signal and the measured signal are used by the controller 110 to adjust the EHSV position until a desired position is attained in a closed control loop.

In addition to actuator feedback, each spoiler may include an angular displacement measuring device for measuring a respective spoiler surface angle, such as a rotary variable differential transformer (RVDT). As depicted in FIG. 1, RVDTs 171, 172, 175, and 176 are coupled to spoilers 121, 122, 125, and 126, respectively; similarly, RVDTs 173 and 174 are coupled to spoilers 123 and 124, respectively. A signal from the RVDT of the respective spoiler angle is fed back to primary controller 110 and compared to a commanded spoiler angle for providing closed-loop control.

Differences between the commanded angle and the measured angle are used by the controller 110 to adjust the EHSV position until a desired spoiler angle is attained.

Deployment of the roll spoilers is based on aircraft inputs, which may include inputs from a pilot control wheel 101 and a co-pilot control wheel 102 (which may be mechanically coupled for coordinated movement) via a set of RVDTs 104 that measure control wheel position and a flap position indicator 112. Additional aircraft inputs include a speedbrake handle position 105 (e.g., determined using dual RVDTs) to control speedbrake deployment along with an angle-of-attack (AOA) indicator 113 and throttle-lever angle 116 (TLA) from a full-authority-digital-engine controller (FADEC) to control automatic stow of the speedbrakes. For ground spoiler deployment, inputs include an auto-deploy disarm switch 111, wheel speed 114, weight-on-wheels 115 (e.g., switches onboard the main landing gear that indicate when the main gear are weighted on the ground), TLA 116, a secondary TLA 117, and a secondary flap position 118. The secondary TLA 117 and secondary flap position 118 are received from the avionics bus to provide dissimilar and redundant signals in addition to TLA 116 and flap position 112.

Figure 4:
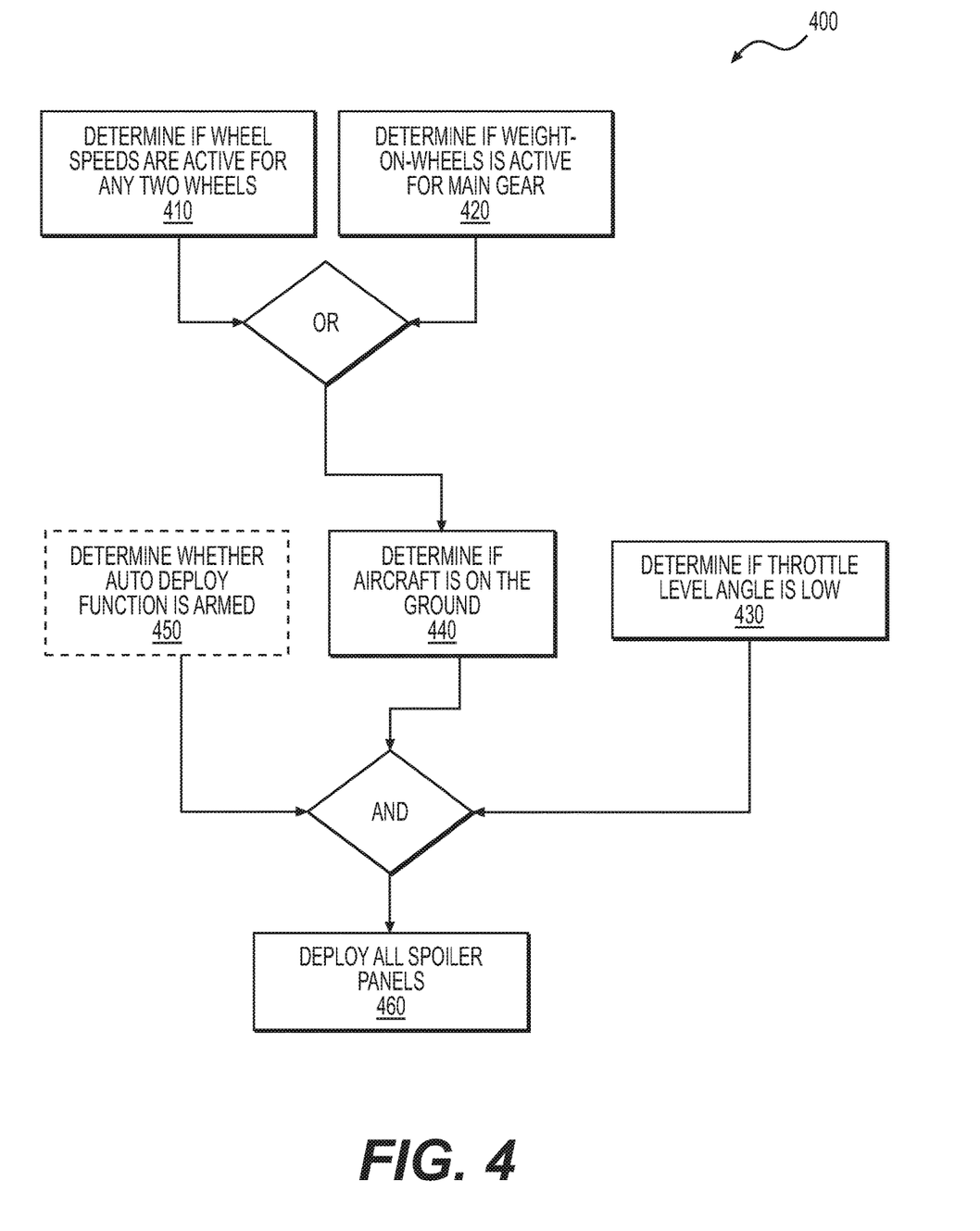
FIG. 4 shows steps of one embodiment of a method for determining ground-spoiler deployment.
Figure 5:
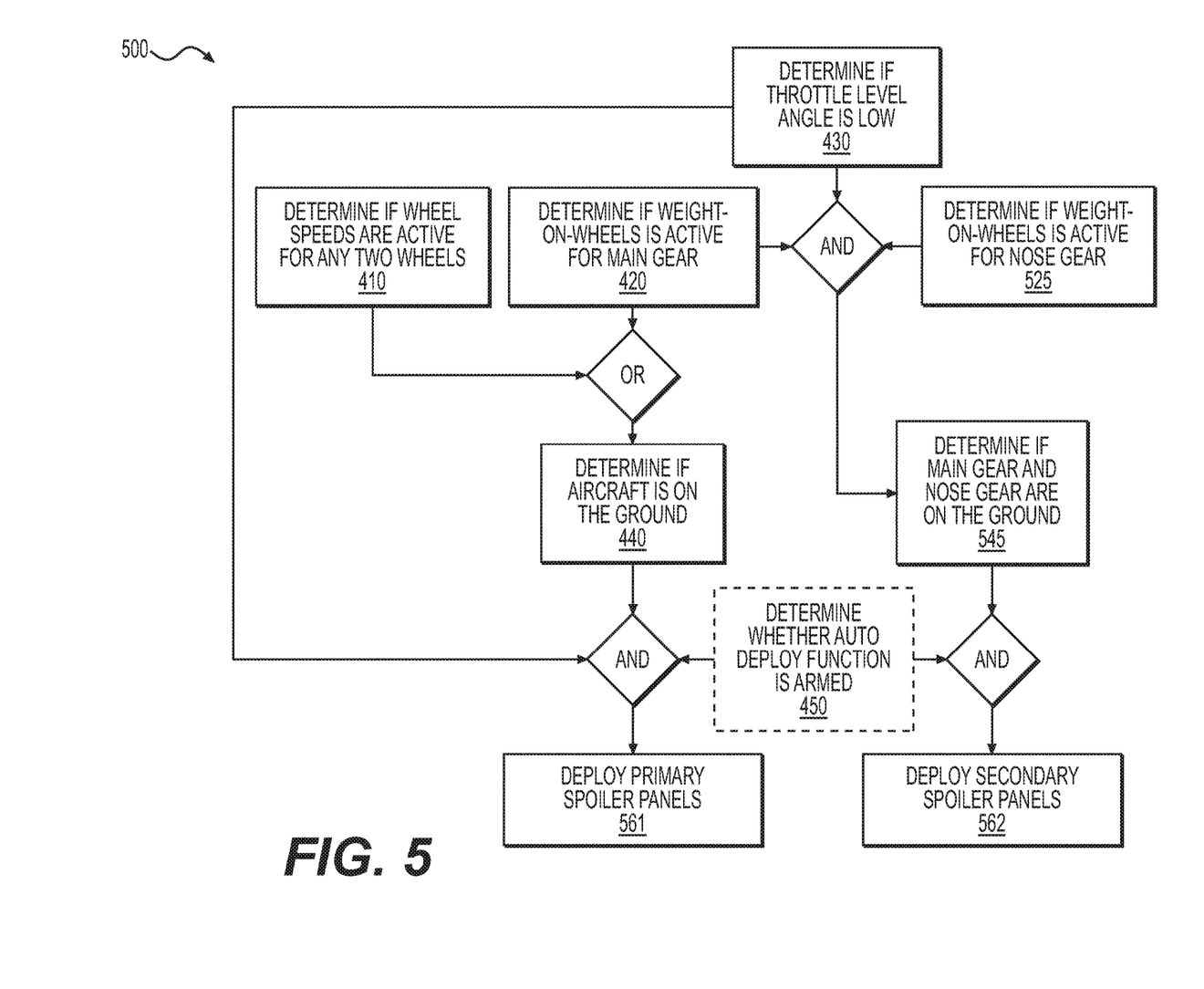
FIG. 5 shows steps of another embodiment of a method for determining ground-spoiler deployment.

In certain embodiments, deployment of the spoilers is based on a subset of inputs (e.g., wheel speed 114, weight-on-wheels 115, and TLA 116). Other combinations of inputs may be used by primary controller 110 for deploying spoilers 121-126 without departing from the scope hereof. Exemplary control logic diagrams for spoiler deployment based on various inputs are depicted in FIGS. 4 and 5 and described below. Primary controller 110 also provides an output signal to other aircraft control systems 108 (e.g., avionics, engine-indicating and crew-alerting system (EICAS), and flight-data recorder (FDR)).

FIG. 2 is a schematic diagram showing a secondary ground spoiler control architecture 200. Secondary architecture 200 serves as a back-up control architecture for providing ground spoiler control in a second mode of operation (e.g., a backup mode). The second mode is automatically engaged in parallel with the primary mode for all ground spoiler operations. In certain embodiments, secondary architecture 200 has limited functionality that provides only a ground spoiler control function, not a roll function and a speed-brake function as provided by primary architecture 100. Common mode failures with the primary control and monitor paths are avoided with secondary architecture 200. Components of secondary architecture 200 that are the same as those of primary architecture 100 are enumerated with like numerals as FIG. 1, and their description may not be repeated accordingly.

Secondary architecture 200 includes a secondary controller 210 configured to transmit and receive signals (e.g., analog and/or digital signals) for controlling control surfaces. A secondary 28-volt direct current (DC) bus 219 provides electrical power to secondary controller 210. Signals are transmitted/received using dedicated command and enable signal paths that are dissimilar from those of primary architecture 100. Dissimilar signal paths add a level of safety in case of a systematic failure with one type of signal path.

As depicted in FIG. 2, secondary architecture 200 also provides control of spoilers 121-126, (e.g., similar to primary architecture 100, FIG. 1); however, secondary architecture 200 may be configured to control a subset of spoilers 121-126. Deployment of spoilers 121-126 via secondary controller 210 is based on aircraft inputs that may be the same or different from those of primary architecture 100, FIG. 1. For example, aircraft inputs to secondary controller 210 may include a position of speedbrake handle 105 based on a pair of switches (e.g., a high position switch and a low position switch), as opposed to dual RVDTs used to provide signals to primary controller 110, FIG. 1.

As depicted in FIG. 2, secondary architecture 200 may be configured for open loop command without receiving feedback, as opposed to in primary architecture 100, FIG. 1, which receives feedback from LVDTs 161-164 and/or RVDTs 171-176.

In certain embodiments, primary architecture 100 and/or secondary architecture 200 use electrically-powered hydraulic pumps in a standby configuration to provide backup hydraulic power, instead of using redundant accumulators as described.

Figure 3:
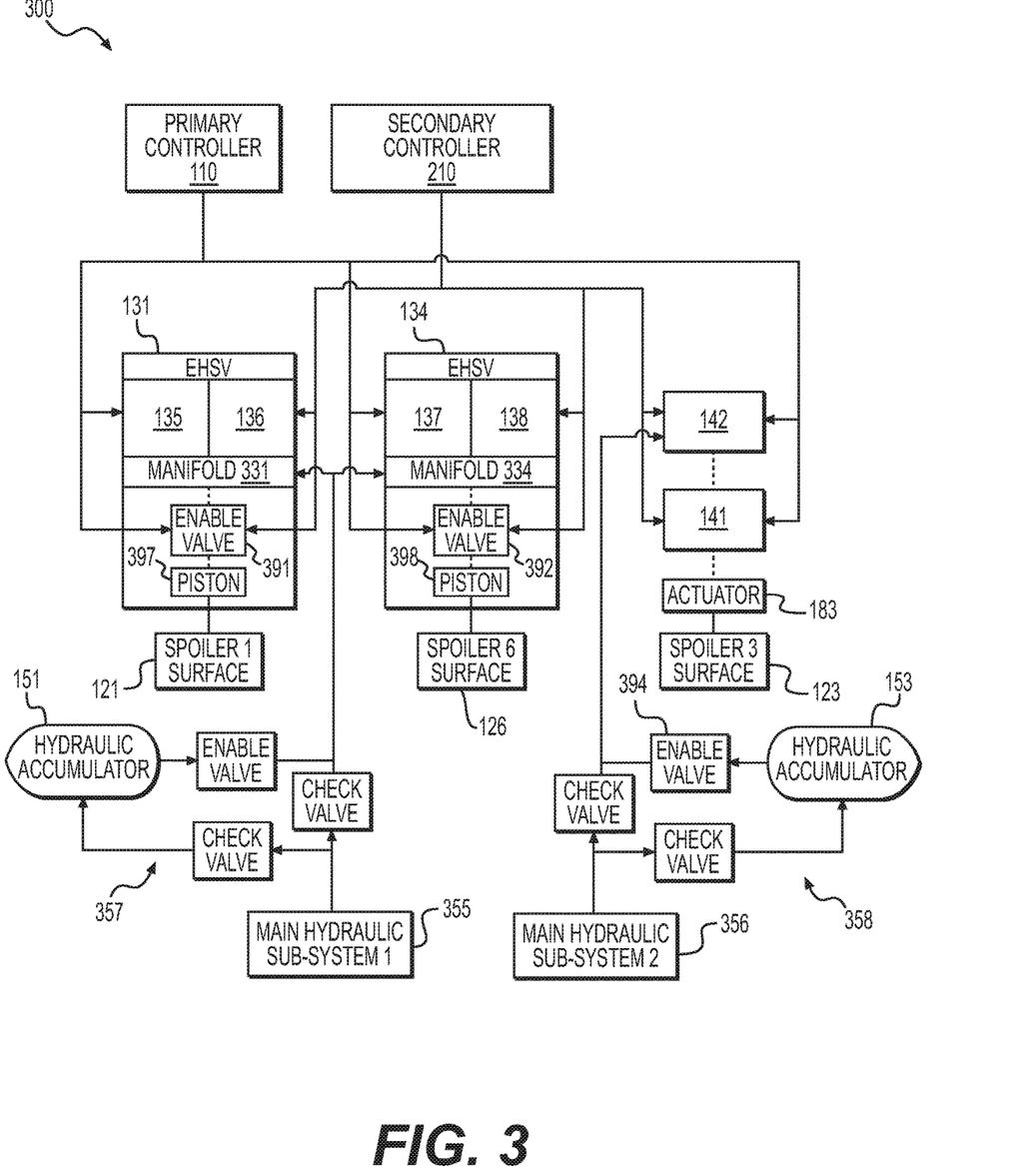
FIG. 3 is a schematic diagram showing portions of the primary ground spoiler control architecture of FIG. 1, portions of the secondary ground spoiler control architecture of FIG. 2, and portions of a hydraulic support architecture for providing pressurized hydraulic fluid, in an embodiment.

FIG. 3 is a schematic diagram showing a hydraulic support architecture for providing pressurized hydraulic fluid to the spoiler actuators. For clarity of illustration, FIG. 3 shows portions of primary architecture 100, FIG. 1 and portions of secondary architecture 200, FIG. 2 corresponding to the outboard roll spoilers and one ground spoiler. In other words, outboard spoilers 121 and 126 and inboard spoiler 123 are shown in FIG. 3, but spoilers 122, 124, and 125 of FIGS. 1 and 2 are not shown in FIG. 3.

EHSVs 131-134 include an electrically controlled valve (e.g., a torque motor controlling a hydraulic jet nozzle to affect the position of a hydraulic flow-control spool) to control flow of hydraulic fluid to an actuator. In the embodiment depicted in FIG. 3, each EHSV includes a primary torque motor engaged with a secondary torque motor such that both torque motors operate in concert with one another and both torque motors are physically linked to the same jet valve. For example, first EHSV 131 includes a primary torque motor 135 and a secondary torque motor 136. Similarly, fourth EHSV 134 includes a primary torque motor 137 and a secondary torque motor 138. Primary torque motors 135, 137 are controlled by primary controller 110 and secondary torque motors 136, 138 are independently controlled by secondary controller 210. In this manner, receipt of one control signal from either controller will successfully command operation of the EHSV.

Manifolds 331 and 332 fluidly couple hydraulic fluid pressure to an enable valve. For example, manifold 331 fluidly couples hydraulic pressure supplied by a first main hydraulic sub-system 355 and stored in first hydraulic accumulator 151 to an enable valve 391. Similarly, manifold 332 fluidly couples hydraulic pressure supplied by first main hydraulic sub-system 355 and stored in first hydraulic accumulator 151 to an enable valve 392. Enable valves 391, 392 may each be controlled via primary controller 110 or secondary controller 210, as depicted in FIG. 3.

EHSVs 131, 132, 231, 232 regulate hydraulic fluid volumetric flow, while the enable valves provide a binary valve (e.g., open/closed) that enables flow of hydraulic fluid to a piston for moving a control surface when open and disables the flow when closed. For example, enable valve 391 controls hydraulic fluid flow to a piston 397 for driving spoiler 121, and enable valve 392 controls hydraulic fluid flow to a piston 398 for driving spoiler 122. Enable valves may also be used to couple hydraulic fluid from a hydraulic accumulator to an actuator. For example, an enable valve 393 is used to open/close flow from hydraulic accumulator 151 and enable valve 394 is used to open/close flow from hydraulic accumulator 153. Each enable valve may include a single solenoid valve or two solenoid valves in parallel. Dual control commands may be provided by primary controller 110 or secondary controller 210 (e.g., even for a single solenoid valve).

First and second main hydraulic sub-systems 355, 356 provide hydraulic pressure in parallel to the accumulators 151, 153 and may be used to recharge the hydraulic accumulators. For example, as depicted in FIG. 3, a first main hydraulic subsystem 355 is configured to recharge hydraulic accumulator 151 via a first recharge circuit 357, and a second main hydraulic subsystem 356 is configured to recharge hydraulic accumulator 153 via a second recharge circuit 358.

FIG. 4 is an exemplary logic diagram showing steps of a method 400 for determining ground-spoiler deployment. Steps of method 400 may be performed by a ground-spoiler controller, such as primary controller 110, FIG. 1. All source signals for ground-spoiler deployment are duplicated such that a single failure of any signal set does not prevent ground-spoiler deployment. In the embodiment depicted in FIG. 4, all spoiler panels are deployed simultaneously upon touchdown of the aircraft.

Step 410 determines if any two wheel-speeds are active. In an example of step 410, primary controller 110 determines if any two wheels are actively rotating based on indications of wheel speed 114, FIG. 1. For example, wheel speed signals may be provided from sensors on left and right inboard and left and right outboard wheels of the main landing gear.

Step 420 determines whether a weight-on-wheels signal is active for the main landing gear. In example of step 420, primary controller 110 compiles input signals from weight-on-wheels 115, FIG. 1 to determine if the aircraft's main landing gear is weighted. For example, an active signal is provided when switches of the main landing gear are triggered (e.g., when the left and right mid landing gear are weighted).

Step 430 compiles signals for throttle-lever angle (TLA) to determine if the TLA is low. In an example of step 430, primary controller 110 receives TLA 116 signal from the FADEC module and determines if the TLA is in the low position. In certain embodiments, secondary TLA signal 117 may be independently received from the avionics bus. In situations where more than one TLA signal is received by the controller, the TLA is considered low if both TLA signals indicate a low position. Based on the TLA position, primary controller 110 determines whether the aircraft is in a landing configuration.

Step 440 determines whether the aircraft is on the ground. In an example of step 440, primary controller 110 determines whether the weight-on-wheels indication has been activated based on signals received from one of step 410 or step 420. In other words, if any two wheels are active or weight-on-wheels is active for the main landing gear, then step 440 determines that the aircraft is on the ground.

Optional step 450 determines whether an auto deploy function for the primary spoiler panels is armed. In an example of step 450, primary controller 110 receives an indication from auto-deploy disarm switch 111, FIG. 1 as to the status of the auto-deploy switch. The disarm switch is an optional feature and is not required for all embodiments of ground spoiler.

Step 460 determines whether to activate deployment of all spoiler panels. In an example of step 460, primary controller 110 determines whether to activate deployment of first spoiler 121, second spoiler 122, third spoiler 123, fourth spoiler 124, fifth spoiler 125, and sixth spoiler 126 of FIG. 1 based on input signals from steps 430, 440 and optionally 450. For example, without a disarm switch, step 460 enables the controller to send the signal for primary spoiler panel deployment when the aircraft is on the ground and both TLA signals are low indicating that the aircraft is in a landing configuration. If a disarm switch is present, the auto deploy function must also be armed.

In operation, if any two-wheel speeds are active in step 410 or weight-on-wheels is active in step 420, then step 440 determines that the aircraft is on-ground. When the TLA is low (as indicated in step 430) indicating a landing configuration and the optional auto deploy function for the spoiler panels is armed (if a disarm switch is present), then step 460 activates deployment of the spoiler panels.

FIG. 5 is an exemplary logic diagram showing steps of a method 500 for determining ground-spoiler deployment. Method 500 has additional logic components compared to method 400, FIG. 4, which are used in certain embodiments. Steps enumerated with like numerals in FIGS. 4 and 5 are the same and their description may not be repeated accordingly.

In the embodiment depicted in FIG. 5, a portion of the spoiler panels (e.g., primary spoiler panels) are deployed initially (in step 561) upon main landing gear touchdown. Subsequently, the remaining portion of spoiler panels (e.g., secondary spoiler panels) are deployed upon nose landing-gear touchdown (in step 562). For example, the primary spoiler panels may include first, second, fifth, and sixth spoilers 121, 122, 125, and 126 of FIG. 1, while secondary spoiler panels include third and fourth spoilers 123 and 124 of FIG. 1. Waiting for nose landing-gear touchdown before deploying secondary spoiler panels may help with an aircraft pitching moment or other aerodynamic characteristics.

Step 525 determines whether a weight-on-wheels signal is active for the nose landing gear. In an example of step 525, primary controller 110 compiles input signals from weight-on-wheels 115, FIG. 1 to determine if the aircraft's nose landing gear is weighted.

Step 545 determines if the aircraft's main landing gear and nose landing gear are both on the ground. This is performed by combining the output of steps 420, 430, and 525. As described above in connection with FIG. 4, step 420 determines whether the main landing gear weight-on-wheels signal has been activated, and step 430 determines whether both TLA signals are low indicating a landing configuration. If all three of these steps 420, 430, and 525 are positive, then step 545 determines that both the main and nose landing gear are on the ground.

Step 561 determines whether to activate deployment of primary spoiler panels. In an example of step 561, primary controller 110, FIG. 1 delivers signals to deploy first, second, fifth, and sixth spoilers 121, 122, 125, and 126, FIG. 1 based on input received via steps 440 and optional step 450. As described above in connection with FIG. 4, step 440 determines whether the main landing gear is on the ground, and step 450 determines whether an auto deploy function for the primary spoiler panels is armed when a disarm switch is present. When the aircraft is on the ground and the auto deploy function is armed (when a disarm switch is present), then step 561 enables the controller to send the signal for primary spoiler panel deployment.

Step 562 determines whether to activate deployment of secondary spoiler panels. In an example of step 562, primary controller 110, FIG. 1 delivers signals to deploy third spoiler 123 and fourth spoiler 124, FIG. 1 based on input received via step 545 and optional step 450. As described above, step 545 determines whether both the main and nose landing gear are on the ground.

In operation during an aircraft landing, the main landing gear touches down initially followed by the nose landing gear. As the main landing gear touches down, the controller executes method 500 to deploy the primary spoiler panels, and as the nose landing gear touches down, method 500 deploys the secondary spoiler panels.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and sub-combinations are of utility and may be employed without reference to other features and sub-combinations and are contemplated within the scope of the claims. Not all steps listed in the various figures need be carried out in the specific order described.

What is claimed is:

1. A ground spoiler control architecture for aircraft, comprising:
    a plurality of actuators each adapted for actuating a respective one of a plurality of ground spoilers;
    a primary controller communicatively coupled to the plurality of actuators for controlling the actuators based on a first set of input signals in a first mode;
    a secondary controller communicatively coupled to the plurality of actuators for controlling the actuators based on a second set of input signals in a second mode; and
    duplicate primary communication signaling paths for transmitting signals from the primary controller to the plurality of actuators to provide redundancy for transmitting signals;
    duplicate primary monitoring signaling paths for receiving signals by the primary controller from the plurality of actuators to provide redundancy for receiving signals; and
    the primary controller is configured to transmit duplicate signal sets for every transmitted signal via each of the duplicate primary communication signaling paths and to receive duplicate signal sets for every received signal via each of the duplicate primary monitoring signaling paths.

2. The ground spoiler control architecture of claim 1, wherein the primary controller and the plurality of actuators are adapted to provide a roll function, a speed-brake function, and a ground spoiler function in the first mode.

3. The ground spoiler control architecture of claim 2, wherein the secondary controller is adapted to provide only the ground spoiler function in the second mode indicated by a failure of the primary controller or one or more of the plurality of actuators.

4. The ground spoiler control architecture of claim 1, wherein the secondary controller is communicatively coupled to the actuators via secondary communication signaling paths for transmitting signals to the actuators and via secondary monitoring signaling paths for receiving signals from the actuators, the secondary communication signaling paths being dissimilar from the duplicate primary communication signaling paths, and the secondary monitoring signaling paths being dissimilar from the duplicate primary monitoring signaling paths, thereby providing additional safety in case of a systematic failure of one type of signaling path.

5. The ground spoiler control architecture of claim 1, wherein the plurality of actuators includes at least one actuator having an electro-hydraulic servo valve and at least one actuator having a solenoid valve.

6. The ground spoiler control architecture of claim 1, further comprising:
    a first hydraulic subsystem having a first hydraulic accumulator for storing pressurized hydraulic fluid, the first hydraulic accumulator being fluidly coupled to one or more of the plurality of actuators via an a first enable valve under control of the primary controller; and
    a second hydraulic subsystem having a second hydraulic accumulator for storing pressurized hydraulic fluid, the second hydraulic accumulator being fluidly coupled to one or more of the plurality of actuators via a second enable valve under control of the secondary controller.

7. The ground spoiler control architecture of claim 1, wherein a set of input signals includes a wheel-speed signal, a weight-on-wheels signal, a throttle-lever-angle signal, and an auto-deploy-function signal.

8. The ground spoiler control architecture of claim 1, further comprising a plurality of position displacement measuring devices coupled respectively with each of the plurality of actuators to provide an actuator position to the primary controller for comparing with a command signal.

9. The ground spoiler control architecture of claim 1, further comprising a plurality of angular-displacement measuring devices coupled respectively with each of the plurality of ground spoilers to provide a ground-spoiler surface angle to the primary controller for comparing with a command signal.

10. A ground spoiler control architecture for aircraft, comprising:
    a plurality of actuators each adapted for actuating a respective one of a plurality of ground spoilers; and
    a controller communicatively coupled to the plurality of actuators for controlling the actuators based on a set of input signals, the set of input signals comprising:
        a throttle-level angle signal;
        a main weight-on-wheels signal for a main landing gear; and
        a nose weight-on-wheels signal for a nose landing gear, such that a first portion of the plurality of ground spoilers deploy upon an active main weight-on-wheels signal and a second portion of the plurality of ground spoilers deploy upon an active nose weight-on-wheels signal.

11. A ground spoiler control architecture for aircraft, comprising:
    a primary control architecture for providing a roll function, a speed-brake function, and a ground spoiler function in a first mode, the primary control architecture comprising:
        a plurality of ground spoilers each controllable by an actuator from a plurality of actuators, respectively;
        a primary controller communicatively coupled to the plurality of actuators via a primary set of signaling paths, respectively, wherein each signaling path in the primary set is provided in duplicate; and
        the primary controller transmits and receives a primary signal set in duplicate via the primary set of signaling paths; and
    a secondary control architecture for providing the ground spoiler function in a second mode in the event of a failure of the primary control architecture, the secondary control architecture comprising:
        a secondary controller communicatively coupled to the plurality of actuators via a secondary set of signaling paths, respectively, wherein each signaling path in the secondary set is provided in duplicate; and the secondary controller transmits and receives a secondary signal set in duplicate via the secondary set of signaling paths.

12. The ground spoiler control architecture of claim 11, further comprising a plurality of hydraulic accumulators each configured to provide pressurized hydraulic fluid to one or more of the plurality of actuators under control of the primary controller in the first mode and under control of the secondary controller in the second mode.

13. The ground spoiler control architecture of claim 11, wherein the primary control architecture further comprises:

a plurality of position displacement measuring devices coupled respectively with each of the plurality of actuators to provide an actuator position to the primary controller for providing a closed control loop; and a plurality of angular-displacement measuring devices coupled respectively with each of the plurality of ground spoilers to provide a ground-spoiler surface angle to the primary controller for providing a closed control loop.

14. The ground spoiler control architecture of claim 11, wherein the secondary architecture is configured for providing open-loop commands.

15. A ground spoiler control method for an aircraft, comprising:

determining whether the aircraft is on the ground based on whether any two wheels speeds are active or whether a main landing gear is weighted;

deploying a primary subset of a plurality of ground spoiler panels when the aircraft is in a landing configuration based on a throttle-level-angle and when the main landing gear is on the ground;

determining whether a nose landing gear is on the ground based on whether the nose landing gear is weighted; and deploying a secondary subset of the plurality of ground spoiler panels when the aircraft is in the landing configuration and the nose landing gear is on the ground.

16. The ground spoiler control method of claim 15, wherein deploying the primary subset of the plurality of ground spoiler panels and the secondary subset of the plurality of ground spoiler panels is further based on whether an auto-deploy function is armed.

* * * * *